June 6, 1961 K. L. BURGENER 2,987,580
SELECTOR CIRCUIT
Filed Sept. 19, 1958
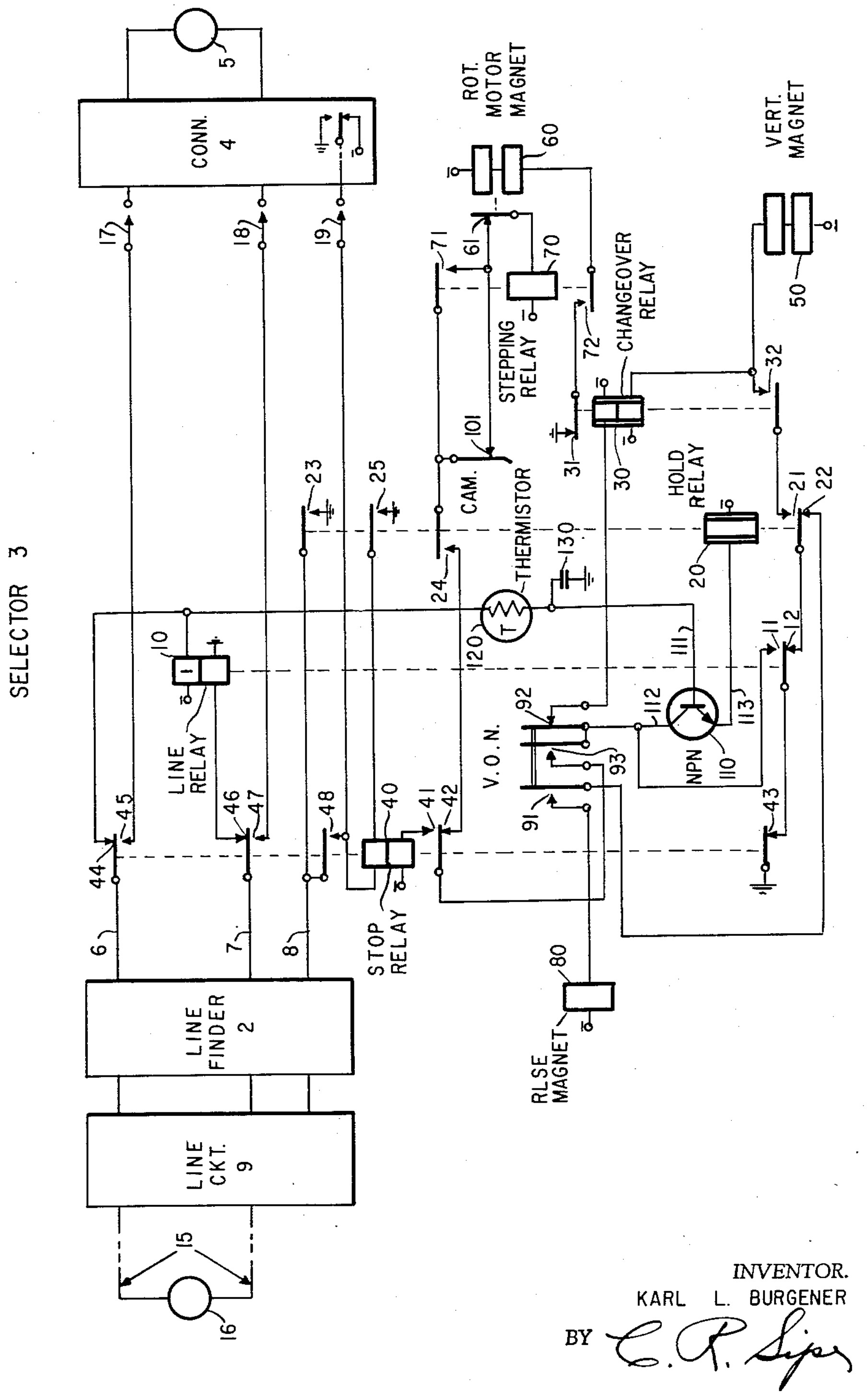
INVENTOR.
KARL L. BURGENER
BY C. R. Sipe
ATTY 2,987,580
Patented June 6, 1961

2,987,580

SELECTOR CIRCUIT

Karl L. Burgener, Villa Park, Ill., assignor to Automatic Electric Laboratories, Inc., a corporation of Delaware Filed Sept. 19, 1958, Ser. No. 762,107
6 Claims. (Cl. 179—18)

This invention relates in general to automatic telephone systems, and more particularly to a novel circuit arrangement for releasing common switching equipment therein seized by faulty lines.

Telephone lines have a certain leakage resistance, i.e., resistance between the two conductors of a line. Ordinarily this leakage resistance is relatively very high, and does not interfere with the transmission of signals or voice currents over the line. However, if the line becomes wet, or if some other nonstandard condition occurs, the leakage resistance may be reduced to a value which will interfere with line transmission. There is a certain range of values of leakage resistance which will hold a switch train operated even though the subscriber has disconnected after seizing the first numerical switch by lifting his receiver. If the line leakage resistance is of such a value that dial impulses cannot be transmitted, the selector, in addition to the line-finder or line switch, can be held operated by the line leakage resistance. The subscriber's service is interrupted as long as the switch train remains connected to his line, and the switching equipment is tied up with the subscriber line rather than being available for other calls. Therefore, it is desirable to release the seized switch train from the subscriber line. Because of the low line leakage resistance, voice transmission on the line will be somewhat impaired, but still intelligible.

It is, therefore, the primary object of this invention to provide an arrangement for releasing a switch train seized by a fault on a line, thereby restoring the line to service and rendering the switching equipment available for other calls.

According to a principal feature of the invention, a transistor is used in a numerical switch, and this transistor, in conjunction with a hold relay, is effective to release the switch train (linefinder or line switch and selector or connector) seized by a faulty line when a subscriber has replaced his receiver after failing to dial or after having been unable to transmit dial impulses because of the low line leakage resistance.

According to another feature of the invention, a nonlinear resistance is employed to regulate the operation of the transistor, responsive to changes in line loop current.

According to another feature of the invention, a capacitor is employed to prolong the conduction period of the transistor during dial pulsing in order to assure that the hold relay of the switch will remain operated.

The invention as to its method of operation will best be understood by reference to the following specification taken in connection with the accompanying drawing. This drawing shows a selector switch as part of a switch train in a telephone system. The circuit of this selector is conventional except for the electronic means provided to control the release of the hold relay in accordance with the electric condition of the line.

In the drawing, selector 3 is connected to linefinder 2 by line conductors 6 and 7 and control conductor 8, and may be connected to connector 4 through wipers 17, 18, and 19 in a well-known manner by dial impulses received from subscriber 16 over subscriber line 15, line circuit 9 and linefinder 2. Alternately, linefinder 2 may be replaced by a line switch.

When the subscriber removes his receiver in an outgoing call, a connection to his line is made by linefinder 2 in a well-known manner, and upon switch-through of the linefinder to selector 3, line relay 10 of the selector is operated over conductors 6 and 7 and the calling loop. As will be noted from the drawing, the output circuit of transistor 110, which includes its collector 112 and emitter 113, extends through the winding of hold relay 20 to battery. Transistor 110 is preferably of the junction type. Since the base of transistor 110 is connected in series with non-linear resistance 120 to a terminal on the line side of winding 1 of relay 10, the potential on base 111 of transistor 110, which is normally at battery potential through this winding, is now shifted to a point between battery and ground so that the base-emitter path of the transistor becomes conductive. With the transistor thus in a conductive state, a circuit for relay 20 is completed from ground over contacts 43 and 11, and through collector 112, emitter 113, and the winding of hold relay 20 to battery. Relay 20 operates, and at contact 23 places ground on control conductor 8 to maintain linefinder 2 operated. Changeover relay 30 also operates from ground over contacts 43, 11 and 92 to its upper winding and battery.

Assuming that subscriber line 15 is in standard operating condition, subsequent actuation by the subscriber of his dial will result in an intermittent release of line relay 10 so that an impulsing circuit is closed, at contact 12, to vertical magnet 50 and the lower winding of changeover relay 30 in parallel. The further operation of the selector circuit proceeds in the conventional manner, reference being made, for example, to United States Patent 2,529,409 to Newstedt.

Let it now be assumed that subscriber line 15 has a relatively low line leakage resistance, and more particularly a leakage resistance so low that line relay 10, after it has first operated upon the initiation of the call, will tend to remain operated, over this line leakage resistance, upon the opening of the loop at substation 16 when the subscriber replaces his handset. In this connection it should be noted that under this condition line relay 10 will fail to properly respond to the dial pulses so that the subscriber, being unable to set up his connection, will abandon the call. Since, as assumed, line relay 10 will remain operated when the subscriber disconnects under this condition, the selector will remain connected to the calling line, that is, subscriber 16 will be unable to receive calls incoming to his line (although his line is in satisfactory condition for the transmission of voice currents) and selector 3 will remain withdrawn from the remaining telephone traffic in the central office. This would be particularly undesirable where this office is an unattended office of small size or in cases where at least some of the lines connected to the central office are line-concentrator trunks where line lockout is impractical.

When the subscriber replaces his receiver on such a faulty line the loop including relay 10 is maintained over the line leakage resistance and enough current to keep relay 10 operated flows through this loop. As long as relay 10 is operated, ground through contact 11 is maintained at collector 112, and this will normally keep hold relay 20 operated also. Neither selector 3 nor linefinder 2 will release as long as relay 20 remains operated, since ground is returned to linefinder 2 over control conductor 8, and this ground holds linefinder 2 operated.

However, if the line leakage resistance is in the range of values mentioned above, the voltage at the base of transistor 110 will be shifted, upon the replacing of the handset, sufficiently in the negative direction to render the output circuit of the transistor non-conductive. This will remove ground over contacts 43 and 11 from relay 20, and relay 20 will restore, removing ground from control conductor 8. Linefinder 2 will release, and this, in turn, will permit line relay 10 to restore, thereby opening the circuit for the upper winding of relay 30. The switch train is thus released.

A second case arises in a system in which there are no selector switches, but in which a linefinder or a line switch connects directly to a connector switch. In the connector there is a line relay corresponding to relay 10 in selector 3, and a hold relay corresponding to relay 20 in selector 3. The line relay in the connector is bridged across the line to supply transmission battery to the calling line, and the hold relay in the connector maintains ground on a control conductor, which holds the linefinder or line switch operated. Thus, a transistor may be connected in the same relative position in the connector as in selector 3 in order to release a seized switch train from a faulty calling line. The operation of the transistor in the connector circuit when the latter is seized from a faulty line would be the same as the operation of the transistor in selector 3, as described above.

Non-linear resistor or thermistor 120 is shown connected in series with base 111 of transistor 110 in the drawing. A thermistor is a device having a negative coefficient of resistance; as the current in the thermistor decreases, the resistance offered by the thermistor increases. Thus, because of the effect of the thermistor, the base current of transistor 110, and consequently the emitter current, change more, proportionately, than the loop current. When the calling subscriber with a faulty line replaces his receiver, the loop current decreases considerably, since the line leakage resistance normally is appreciably greater than the loop resistance with the receiver lifted. As the loop current decreases, the base current in the transistor, and consequently the emitter current, decrease proportionately more because of the effect of the thermistor. This proportionately greater decrease of the emitter current assures that the current in the hold relay will decrease sufficiently to permit the hold relay to restore, thereby releasing the seized switch train. A thermistor may be similarly used in a connector switch in a system which has no selector switches, but only linefinders, or line switches, and connector switches.

Capacitor 130 shown in the figure is connected between base 111 of transistor 110 and ground, and this capacitor functions to assure that relay 20 will remain operated during dial pulsing. In the embodiment shown in the drawing, removal of ground from relay 20 during dial pulsing depends on two factors: the release of relay 10 to open contact 11, and the operation of transistor 110 responsive to the potential at the line-side terminal of winding 1 of relay 10. Because the opening of contact 11 is a mechanical operation, it is inherently slower than the operation of transistor 110 responsive to the potential at the above-mentioned terminal. Thus, the operation of the transistor is the factor governing the removal of ground from relay 20. Since relay 20 is a slow-to-release relay, it will not release immediately after ground is removed from it, but only after a certain time delay. Relay 20 is designed so that this time delay normally is longer than one dial pulse interruption, in order that it will not ordinarily release during dial pulsing. However, since the use of transistor 110 in the circuit causes the removal of ground from relay 20 to be dependent on a potential rather than on a mechanical operation, during a dial pulse interruption, ground is removed from relay 20 for a longer portion of each dial pulse interruption. Then relay 20 may have a tendency to "chatter," an undesirable occurrence. Capacitor 130 is provided to prevent this. During the time the loop comprising the line and relay 10 is closed, capacitor 130 becomes charged. When the loop is opened by the dial pulse interruption, the transistor remains in a conductive state, momentarily, and this maintains ground on relay 20, assuring that it remains operated during dial pulsing. A capacitor may be similarly used in a connector switch in a system which has no selector switches, but only linefinders, or line switches, and connector switches.

According to the arrangement shown in this invention, no alarm is given and no signal lamp is lit when the above-described faulty condition occurs on the subscriber line. The invention thus could find use in unattended offices, for example, where the giving of an alarm or the lighting of a signal lamp would be of no immediate avail, or in offices with a restricted number of maintenance personnel, where it would not be possible to respond immediately to rectify the faulty line condition.

While a particular embodiment of the invention has been described, various modifications within the true scope of the invention may be made by those skilled in the art.

What is claimed is:

1. In a telephone system, a line, a first numerical switch terminating said line, and a line relay, a hold relay, and detecting means, having a greater sensitivity to the electrical conditions on said line than does said line relay, in said numerical switch, said hold relay being jointly controlled by said line relay and said detecting means, and said detecting means being connected to said line and being responsive to the current flowing thereover so as to automatically cause said hold relay to release when said current is of less than a predetermined amount.

2. In a telephone system, the combination as claimed in claim 1, in which said detecting means includes a transistor, which is rendered conductive upon seizure of said switch in a call, and is rendered non-conductive when said current drops to a value less than the current required to operate said line relay but large enough to hold said line relay operated.

3. In a telephone system, a line, a selector switch terminating said line, and a line relay, a hold relay, and detecting means, including a transistor, in said switch, said line relay having a make contact and said transistor having an input circuit and an output circuit, said hold relay being connected in said output circuit in series with said make contact, and said input circuit being connected to said line and controlled by the direct current flowing thereover, so as to provide for the automatic release of said hold relay under the control of said transistor when said current is of less than a predetermined amount.

4. In a telephone system, the combination as claimed in claim 3, in which there is further provided in said input circuit a non-linear resistance for amplifying the effect in said transistor input circuit of any change of said current.

5. In a telephone system, the combination as claimed in claim 3, in which there is further provided in said input circuit a capacitor, said capacitor being charged and the input circuit of said transistor being rendered conductive when the direct current circuit comprising said line and said line relay is closed, the charge on said capacitor causing said transistor to remain in a conductive state, during each numerical impulse received, for a period long enough to assure that said hold relay will not release during the transmission of the impulse series.

6. In a telephone system, the combination as claimed in claim 3, in which there is further provided in said input circuit a non-linear resistance and a capacitor, said capacitor being charged and the input circuit of said transistor being rendered conductive when the direct current circuit comprising said line and said line relay is closed, the charge on said capacitor causing said transistor to remain in a conductive state, during each numerical impulse received, for a period long enough to assure that said hold relay will not release during the transmission of the impulse series, and said non-linear resistance amplifying the effect in said transistor input circuit of any change of said current, thereby assuring release of said hold relay at the end of said impulse series when said current becomes less than said predetermined amount.

References Cited in the file of this patent

UNITED STATES PATENTS 2,658,109 Kessler ---------------- Nov. 3, 1953
2,716,674 Kahn ----------------- Aug. 4, 1955